United States Patent [19]
Cooke

[11] 3,894,860
[45] July 15, 1975

[54] INHIBITING CROWN GROWTH ON PINEAPPLE FRUIT

[75] Inventor: Anson Richard Cooke, Hatfield, Pa.

[73] Assignee: Amchem Products, Inc., Ambler, Pa.

[22] Filed: Nov. 20, 1973

[21] Appl. No.: 411,653

Related U.S. Application Data

[63] Continuation-in-part of Ser. No. 66,604, Aug. 24, 1970, abandoned.

[52] U.S. Cl. .................... 71/116; 71/108; 71/118
[51] Int. Cl.² .......................................... A01N 9/24
[58] Field of Search.................... 71/108, 116, 118

[56] References Cited
UNITED STATES PATENTS

| | | | |
|---|---|---|---|
| 2,341,868 | 2/1944 | Hitchcock et al. | 71/108 |
| 2,363,325 | 11/1944 | Hitchcock et al. | 71/108 |
| 2,441,163 | 5/1948 | Mehrlich | 71/118 |
| 2,957,760 | 10/1960 | Tafuro et al. | 71/116 |
| 3,346,397 | 10/1967 | Gortner | 71/108 |

OTHER PUBLICATIONS

Miller et al., "Effect of P-Chlorophenoxyacetic Acid On etc.," (1953) CA47, p. 12733 (1953).
Gowing et al., "Relation of Chemical Structure to etc.," (1960) CA54, p. 22876 (1960).

*Primary Examiner*—Glennon H. Hollrah
*Attorney, Agent, or Firm*—Ernest G. Szoke; Michael E. Zall; Howard S. Katzoff

[57] ABSTRACT

Alpha-(3-chlorophenoxy)-propionic acid, its salts, esters, or amides applied to developing pineapple fruit inhibits the growth of the crown and increases the size and weight of the fruit without injuring the fruit.

5 Claims, No Drawings

INHIBITING CROWN GROWTH ON PINEAPPLE FRUIT

BACKGROUND OF THE INVENTION

This invention is a continuation-in-part of application Ser. No. 66,604, filed Aug. 24, 1970 and now abandoned.

This invention relates to a novel method for inhibiting or controlling the development of the crown on growing pineapple fruit and increases the size and weight of the fruit. As disclosed herein, increased size and weight of pineapple fruit possessing a smaller crown is produced by applying to the growing fruit an effective amount of alpha-(3-chlorophenoxy)-propionic acid, or a salt, ester, or amide thereof. Alternatively an effective amount of an admixture of alpha-(3-chlorophenoxy)-propionic acid with a salt, ester, or amide of alpha-(3-chlorophenoxy)-propionic acid can also be used to practice the method of this invention.

The acid and its salts, esters, and amides used in the method of this invention are known compounds which have been used previously as herbicides for the control and destruction of certain plant species and vegetation and have been employed as growth regulants for reduction of fruit set. For example, U.S. Pat. No. 2,744,818 discloses the preparation of esters of chloroaryloxypropionic acids and their use as herbicidal compositions. Alpha-(3-chlorophenoxy)-propionic acid, its salts, esters, and amides have been utilized for thinning stone fruits and reducing fruit set as disclosed in U.S. Pat. No. 2,957,760.

The large crown which is normally present in pineapple fruit adds considerably to the total weight of the fruit and also causes difficulty in the packaging of the fruit for shipment. On some varieties, for example, Masmerah, the crown can become so large and heavy that the fruit and peduncle are lodged i.e. bent or fallen over, placing the fruit in close proximity with the soil, thereby causing fruit spoilage. Furthermore, the crown is quite spiny and can result in bruising of other fruit when packed for shipping. Presently, there is no method known to the art of hindering the development of the crown on pineapple fruit except for mechanically injuring the crown to stunt its growth. The current procedure in the art is to go through the field early in the growing season and manually destroy the growing point of the crown with an instrument such as an iron spike. When thousands of plants are grown per acre such mechanical methods are too expensive and time consuming to be practicable. Furthermore, a typical practice of manually striking the crown from the fruit at harvest time, the manual method is found to increase the incidence of a condition known as "broken core", wherein the central core is injured and can become diseased in storage, thereby reducing the quality of the harvested fruit.

The primary object of this invention is to provide a chemical treatment which will reduce crown development on pineapple fruit.

A further object of this invention is to provide a process which will inhibit crown growth and development on pineapaple fruit and increase the size and weight of the fruit without the danger of injury to the growing fruit or the vegetative plant.

Other objects of this invention are to eliminate the crown from the fruit prior to harvesting of the fruit and increase the size and weight of the fruit, or make the crown to be easily removed at harvest time.

Another object of this invention is to provide a process which will produce pineapple fruit with small crowns or no crown thereby making the fruit easier to pack, cutting down on bruising, and reducing the shipping weight of each fruit.

Another object of this invention is to provide a process which will produce pineapple fruit of improved quality and increased size and weight of the fruit with small crowns, wherein the fruit can remain upright in the field under a reduced crown weight and wherein the incidence of broken core is reduced.

Other objects will be disclosed and be made evident in the following description.

DETAILED DESCRIPTION

The method of this invention involves the application of alpha-(3-chlorophenoxy)-propionic acid or a functional derivative of alpha-(3-chlorophenoxy)-propionic acid to the growing pineapple fruit. More particularly this invention relates to the use of alpha-(3-chlorophenoxy)-propionic acid and its esters, amides and salts of the general formula:

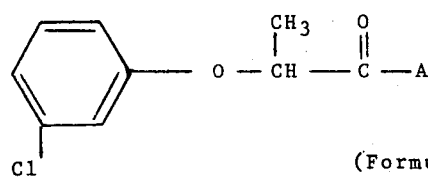

(Formula I)

wherein A is a member selected from the group consisting of OH, $NH_2$, $NHR_1$, $NR_1R_2$, $OR_3$ and OX; and $R_1$ and $R_2$ are each independently an alkyl group containing from 1 to 4 carbon atoms; $R_3$ is selected from the group consisting of (a) saturated straight or branched chain alkyl groups such as methyl, ethyl, propyl, butyl, octyl, nonyl, and decyl, (b) diethylene glycol monoethyl ether groups (hereinafter referred to as Cellosolve groups) such as, for example, ethyl and butyl Cellosolve, and (c) glycol and polyethylene glycol groups such as those of the polyglycol monoethers of the formula $R_4(OC_nH_{2n})_mOH$, where $R_4$ represents an alkyl radical from 1 to 4 carbon atoms, $n$ is an integer from 2 to 3 inclusive, and $m$ is an integer from 1 to 3 inclusvie; and X is selected from the group consisting of either an ammonium radical or an alkali metal ion such as sodium or potassium.

Alpha-(3-chlorophenoxy)-propionic acid, as well as the aforementioned functional derivatives or mixtures thereof, is highly effective in suppressing the development of the crown of pineapple fruit, and can, in fact, eliminate it from the fruit when applied in accordance with the process of this invention and simultaneously increase the size and weight of the fruit. The preferred compounds for use in accordance with this invention are alpha-(3-chlorophenoxy)-propionic acid and alpha-(3-chlorophenoxy)-propionamide.

The compounds used in the method of this invention may be conveniently applied as an overall foliar spray or applied directly to the crown of the young developing fruit. They can be applied in the form of solutions, emulsions, dust formulations, and the like.

The water soluble compounds can be simply dissolved in an amount of water sufficient to give the desired concentration for practical application and are preferably sprayed in aqueous solutions. A small amount of wetting agent may be added, in the case of aqueous solutions, to increase the penetration into the tissue of the crown and to improve the flow characteristics of the liquid.

Those compounds that are not sufficiently water soluble for convenient formulation into aqueous concentrations can be prepared as liquid emulsions by dissolving the compounds in a small amount of a non-phytotoxic solvent, then adding an emulsifier and water.

The compounds can be formulated as wettable powders, with conventional excipients such as surfactants, fillers, and the like. The compounds can also be applied as dusts where they are adsrobed onto a suitable powdered carrier such as vermiculite, attaclay, talc and the like.

An admixture of two or more compounds of Formula I can be employed in the process of the present invention. Should such an admixture be employed, there is no prescribed ratio in which each particular compound must be present. The concentration of the admixture need only be within the concentration range of active material prescribed herein, and the rate of application of the admixture should be within the effective range prescribed herein.

The compounds or admixture of compounds used in the method of this invention can be employed as a liquid foliar spray. Should the spray be of a broadcast nature it can have the compounds or admixture of compounds at a concentration of about 1000 ppm (mg/l) to about 8000 ppm of active ingredient, and preferably about 1500 to 4000 ppm. It is preferred that the spray be directed to the area of row wherein primarily the crown should receive the spray for economic and conservation reasons.

The compounds or admixture of compounds used in the method of this invention can alternatively be employed as a solution having a concentration of about 100 ppm to about 4000 ppm when applied only to the growing crown of the pineapple fruit. It is preferable to employ concentrate ratios of about 400 to about 2000 ppm in direct applications exclusively to the growing crown.

The compounds can be applied at any time subsequent to flowering and until about the time the crowns are typically mechanically inhibited. It is preferable to apply the compound when the crown of the fruit is approximately 2–4 inches long or when the fruit is about one-fifth of its final size.

What is considered to be an effective amount or effective rate of application of the compound will depend on the mode of application and the state of the fruit's development when application is made. Ordinarily, an effective rate of application, when applied directly to the crown requires from about 5 ml to about 25 ml per plant. When treatment is made as a foliar spray, a volume delivery rate from about 100 to about 250 gallons per acre is employed.

Any suitable formulation can be employed such that the rate of application of active material of Formula I is from about 0.1 to about 5 lbs/acre in the form of a suitable aqueous solution, emulsion, dust formulation, or the like. The precise amount of active material applied will depend upon the degree of response which is desired.

Illustrative but non-limitative examples of formulations other than aqueous solutions of the water soluble compounds are as follows:

FORMULATION I

| | Parts |
|---|---|
| Alpha-(3-chlorophenoxy)methyl propionate | 1 |
| 555 oil (aromatic petroleum oil) | 2 |
| Atlas G-1255 emulsifier (polyethylene sorbitol tall oil condensate) | ½ |

FORMULATION II

| | Parts |
|---|---|
| Butyl cellosolve ester of alpha-(3-chlorophenoxy)-propionic acid | ½ |
| 555 oil | 2 |
| Atlas G-1255 | 1 |

FORMULATION III

| | Percent by wt. |
|---|---|
| Alpha-(3-chlorophenoxy)-propionic acid | 8.33 |
| Marasperse | 2.00 |
| Nekal BX 78 | 1.00 |
| Attaclay | 88.67 |

The following examples will illustrate the application of the compounds and the response of the fruit and crown. These examples are illustrative of the invention and are not to be considered as limiting for other compounds falling within the scope of this invention that might be substituted.

EXAMPLE I

Alpha-(3-chlorophenoxy)-propionic acid was applied as a foliar spray to the Smooth Cayene variety of pineapple, to determine the effect on crown development. The differences in development of the crown after application were compared with untreated control fruits.

The acid was applied at concentrations of 100, 200, 400, and 1000 ppm, at a rate of application of 100 gal./acre. Each concentrate was employed to treat 200 plants.

At the time of application the plants were bearing small fruit, and observations were made 60 days after application. With all treatments there had been no ill effects on fruit development and the fruits appeared at the time of observation as desirable as the fruit of control plants, except for the relative sizes of the crowns. There was also no injurious effect on the vegetative growth of the treated plants as compared to the control plants.

The results of the treatments are illustrated in Table I.

TABLE I

| Concentration (ppm) | Observations |
|---|---|
| 0 — Control | Normal crown development and growth. |
| 100 | Similar in structure, development, and size to control fruits. |

TABLE I-Continued

| Concentration (ppm) | Observations |
| --- | --- |
| 200 | Development of the leaves of the crown slightly inhibited. |
| 400 | Flattening of the crown with much less development of the leaves. |
| 1000 | Almost a complete dropping away of the crown leaves. Where the crown normally develops, a slight protrusion was noticeable. |

EXAMPLE II

An admixture of alpha-(3-chlorophenoxy)-propionic acid and alpha-(3-chlorophenoxy)-propionamide was employed. The admixture of concentrate of amide and acid was prepared by adding 19 parts amide to 1 part acid by weight. Methanol and diacetone alcohol were employed as inert solvents. The solution was then added to water. The solution, when applied for each treatment, contained acid and amide and sufficient solvent and water to give concentrations of 200, 400, 600, and 1000 ppm to the admixture of each successive test. The application was made directly onto the crown for one test and as a foliar spray for the second test. The rate of application was about 100 gal. per acre for both modes of application.

The Smooth Cayenne variety of pineapple was chosen to be treated in each test. The fruits were treated at the time when mechanical reduction of the crown would normally take place, that is just subsequent to flowering. The characteristics of the treated fruit were compared with untreated controls. The observations were made and recorded 60 days after treatment had been effected. Tables II and III are a complete compilation of the results observed.

TABLE II

Direct Application

| Concentration of Admixture (ppm) | Effect |
| --- | --- |
| 0 — Control | Normal development of crown. |
| 100 ppm (95 ppm amide 5 ppm acid) | Slight reduction of crown development as compared to control, with flattening of upper part of crown. |
| 200 ppm (190 ppm amide 10 ppm acid) | Lower leaves of crown dried out, resulting in a ring without leaves at the base of the crown. |
| 400 ppm (380 ppm amide 20 ppm acid) | Very little crown development with lower crown leaves dried out. |
| 1000 ppm (950 ppm amide 50 ppm acid) | Full inhibition. At most, a small protuberance without leaves. |

TABLE III

| Concentration | Foliar Spray Application Effect |
| --- | --- |
| 0 — Control | Normal development of crown. |
| 100 ppm (95 ppm amide 5 ppm acid) | Slight reduction of the crown in some fruits as compared with controls. |
| 200 ppm (190 ppm amide 10 ppm acid) | Reduction in crown development with flattening of crown and drying out of lower leaves at the base of crown. |
| 400 ppm (380 ppm amide 20 ppm acid) | Slight crown development with dried out crown leaves and a dropping away of the crown leaves. |
| 1000 ppm (950 ppm amide 50 ppm acid) | Slight crown development with drying and a dropping away of the crown leaves. Appearance was a short protuberance with hardly any crown leaf growth. |

EXAMPLE III

Singapore Spanish fruits having crowns of 5 to 8 centimetres in length were treated with an admixture of alpha-(3-chlorophenoxy)-propionic acid and alpha-(3-chlorophenoxy)-propionamide in the proportions and prepared according to the method in Example II above. Each treatment consisted of 120 plants. There were 4 treatments of various concentrations: 100, 200, 400 and 600 ppm, and Control (non-treated) plants. The trial was a randomised block design with 4 replications.

About 5 ml. of aqueous solutions of the various concentrations were applied onto the center of the crown with a dropper. Visual observations were taken 4 weeks after application. At the ripening stage, all the fruits were harvested.

At the time of harvest, measurements were made on the crowns and fruit.

A pronounced scorching of the base of the outer leaves of the crown was seen among the treated plants 4 weeks after application. The apical leaves of the crown continued to develop as these were protected from the chemical by the outer leaves at the time of application. Visual observation at this stage also showed that the crown of all treated plants was smaller than that of the Control. Subsequently, those treated with 100 ppm developed crowns as big as those of the Control.

Measurements taken on the crowns of harvested fruit are shown in Table IV. Table V is a compilation of measurements of external fruit characteristics.

TABLE IV

| Treatments | Crown Length (cm) |
| --- | --- |
| 100 ppm | 33.2 |
| 200 ppm | 29.7 |
| 400 ppm | 26.7 |
| 600 ppm | 16.7 |
| Control (non-treated) | 36.1 |

TABLE V

| Treatments | Fruit Characters | | |
| --- | --- | --- | --- |
| | Mean Fruit Wt. (lb) | Fruit Length (cm) | Breadth* (cm) |
| 100 ppm | 1.78 | 13.3 | 10.2 |
| 200 ppm | 1.90 | 14.0 | 10.7 |
| 400 ppm | 2.00 | 14.4 | 10.9 |
| 600 ppm | 1.99 | 14.3 | 11.1 |
| Control (non-treated) | 1.81 | 13.7 | 10.4 |

*It was noted that breadth as measured at the median point-of-record of treated fruit, carried up more uniformly toward the apex than in the control fruit.

EXAMPLE IV

Singapore Spanish fruits with 5 to 8 centimeters crowns were treated with an admixture of alpha-(3-chlorophenoxy)-propionic acid and alpha-(3-chlorophenoxy)-propionamide in the preparation method according to Example II above. Each treatment consisted of 120 plants. There were 4 treatments of various concentrations: 100, 200, 400 and 600 ppm, a Control (non-treated) plants and Decrown (manual crown removal). The trial was a randomised block design with 4 replications.

About 5 ml. of aqueous solutions of the various concentrations were applied onto the center of the crown with a dropper. Treatment for Decrown was carried out by manual breakage in a manner typical to the art at the same time. Visual observations were taken 4 weeks after applications. At the ripening stage, all the fruits were harvested and the incidence of Broken-core was noted.

Broken-core, an undesirable result of manual crown removal, can occur in typical commercial harvesting practice and can result in fruit spoilage as noted hereinabove.

Table VI is a record of Broken-core noted on harvested fruit of the test.

TABLE VI

| Treatments | Broken-core (%) |
| --- | --- |
| 100 ppm | 0.6 |
| 200 ppm | 2.1 |
| 400 ppm | 2.6 |
| 600 ppm | 4.0 |
| Control (non-treated) | 3.1 |
| Decrown (manual) | 9.2 |

EXAMPLE V

Pineapple fruits of the Masmerah variety were treated with an admixture of alpha-(3-chlorophenoxy)-propionic acid and alpha-(3-chlorophenoxy)-propionic amide in the preparation method according to Example II above. Treatments consisted of: Control (no decrowning) 500; 1,00; 1,500; 2,000; 4,000 and 8,000 ppm of the admixture compounds. Each crown was treated with three to five drops of the chemical and 20 crowns were used per treatment.

Weekly measurements of fruit diameter and crown length were made and weekly samples of fruits were taken to observe the effect on the crown. Tables VII and VIII are complete compilations of the recorded results.

TABLE VII

Crown length (cm) at weeks after treatment

| Admixture Concentration (ppm) | Weeks after treatment | | | | | | |
| --- | --- | --- | --- | --- | --- | --- | --- |
| | 1 | 2 | 3 | 4 | 5 | 6 | 7 |
| Control | 4.70 | 7.03 | 9.98 | 12.86 | 14.0 | 15.71 | 17.14 |
| 500 | 6.39 | 7.97 | 9.43 | 13.36 | 15.48 | 16.33 | 20.06 |
| 1,000 | 5.66 | 6.05 | 6.81 | 7.60 | 9.05 | 10.43 | 12.14 |
| 1,500 | 4.41 | 4.50 | 5.96 | 7.46 | 8.98 | 10.43 | 11.91 |
| 2,000 | 5.04 | 5.94 | 7.35 | 9.21 | 11.81 | 13.19 | 16.28 |
| 4,000 | 4.15 | 4.77 | 5.62 | 7.66 | 9.68 | 12.15 | 14.15 |
| 8,000 | 4.0 | 4.63 | 5.19 | 5.29 | 5.43 | 5.07 | 4.97 |

TABLE VIII

Fruit diameter (cm) at weeks after treatment

| Admixture Concentration (ppm) | Weeks after treatment | | | | | | |
| --- | --- | --- | --- | --- | --- | --- | --- |
| | 1 | 2 | 3 | 4 | 5 | 6 | 7 |
| Control | 6.95 | 7.52 | 8.23 | 8.58 | 9.01 | 9.55 | 9.81 |
| 500 | 7.39 | 8.15 | 8.74 | 9.18 | 9.48 | 9.99 | 10.33 |
| 1,000 | 7.41 | 8.10 | 8.73 | 9.18 | 9.53 | 10.04 | 10.42 |
| 1,500 | 7.02 | 7.85 | 8.27 | 8.61 | 9.13 | 9.58 | 9.93 |
| 2,000 | 7.50 | 8.19 | 8.60 | 9.18 | 9.58 | 10.11 | 10.48 |
| 4,000 | 7.11 | 7.96 | 8.50 | 9.04 | 9.22 | 9.92 | 10.36 |
| 8,000 | 7.14 | 7.69 | 8.24 | 8.78 | 9.26 | 9.68 | 10.16 |

EXAMPLE VI

Pineapple plants of the Red Spanish variety were treated according to two methods. The treatments included alpha-(3-chlorophenoxy)-propionic acid (acid) or alpha-(3-chlorophenoxy)-propionamide (amide) at several concentrations, and a Control (no-treatment). Technical materials were dissolved in methanol and diacetone alcohol and diluted with water to provide solutions of 250, 500, 1000, 1500 and 2000 ppm.

Treatments were made to 90 day old growing fruit by introducing the compound directly into the crown leaf whorl in 10 ml. of solution of the concentrations above via a single nozzle sprayer, or as a foliar spray, sprayed in a land over the row, of 250 gallons per acre of the concentrations.

Each treatment was applied to 10 plants. The fruit was harvested and evaluated approximately 60 days following treatment. This variety typically requires about 150 days from the time of flower-induction to the ripe stage of development. Induction of flowering causes a differentiation to take place in the vegetative plant apex so that fruit begins to develop. The evaluations were taken on 10 fruit from each treatment.

The evaluations comprised of external fruit and crown measurements and a visual rating of the effect of the compounds on the fruit crown. The visual rating was as follows:

0 = no effect as compared to the Control
1 = chemical burn of the lower crown leaves
2 = the lower crown leaves were dead 3 = the crown was mostly dead
4 = the crown was mostly dead and had fallen from the fruit or required only a slight brushing blow with the hand to remove it.

Table IX is a complete compilation of the results.

ture compounds. Ten ml of each solution was introduced directly into the fruit crown whorl of leaves by means of a single nozzle sprayer. An alternate means of treatment employed in the test was to introduce the aqueous treatment solutions to the plant by a broadcast

TABLE IX

| TREATMENT | Conc. (ppm) | APPLICATION | DIAMETER OF FRUIT (IN.) | LENGTH OF FRUIT (IN.) | LENGTH OF CROWN (IN.) | CROWN RATING |
|---|---|---|---|---|---|---|
| Acid | 250 | Crown | 4.5 | 4.2 | 2.1 | 2 |
| Acid | 500 | Crown | 4.5 | 4.3 | 2.0 | 2 |
| Acid | 1000 | Crown | 4.8 | 4.7 | 1.6 | 3 |
| Acid | 1500 | Crown | 4.3 | 4.2 | 0.9 | 4 |
| Acid | 2000 | Crown | 4.7 | 4.9 | 0.1 | 4 |
| Acid | 250 | Foliage | 4.6 | 4.2 | 2.6 | 0 |
| Acid | 500 | Foliage | 4.6 | 4.4 | 2.0 | 0 |
| Acid | 1000 | Foliage | 4.6 | 4.6 | 1.8 | 0 |
| Acid | 1500 | Foliage | 4.9 | 5.0 | 1.8 | 2 |
| Acid | 2000 | Foliage | 4.9 | 5.1 | 1.4 | 3 |
| Amide | 250 | Crown | 4.9 | 4.9 | 2.1 | 0 |
| Amide | 500 | Crown | 5.0 | 5.0 | 2.0 | 1 |
| Amide | 1000 | Crown | 4.7 | 4.7 | 1.8 | 3 |
| Amide | 1500 | Crown | 5.0 | 4.9 | 2.1 | 4 |
| Amide | 2000 | Crown | 4.6 | 4.9 | 0.3 | 4 |
| Amide | 250 | Foliage | 5.0 | 5.1 | 2.5 | 0 |
| Amide | 500 | Foliage | 4.9 | 4.8 | 2.4 | 0 |
| Amide | 1000 | Foliage | 5.0 | 5.1 | 2.4 | 2 |
| Amide | 1500 | Foliage | 4.3 | 4.4 | 1.8 | 0 |
| Amide | 2000 | Foliage | 4.5 | 4.4 | 0.8 | 4 |
| Control | 0 |  | 4.6 | 4.5 | 2.9 | 0 |

EXAMPLE VII

Pineapple plants of the Red Spanish variety were treated with admixtures of alpha-(3-chlorophenoxy)-propionic acid (acid) and alpha-(3-chlorophenoxy)-propionamide (amide) in the ratios of 1:19, 1:1, and 19:1. The various admixtures were dissolved in methanol and diacetone alcohol. Aqueous dilutions of the dissolved admixtures were made to obtain solutions of 250, 500, 1000, 1500 and 2000 ppm of active admixture compounds. Ten ml of each solution was introduced directly into the fruit crown whorl of leaves by means of a single nozzle sprayer. An alternate means of treatment employed in the test was to introduce the aqueous treatment solutions to the plant by a broadcast spray at the rate of 250 gallons per acre.

The treatment time and method of evaluation were the same as in Example VI above.

Table X is a complete compilation of the results.

EXAMPLE VIII

Pineapple plants of the Red Spanish variety were treated with various concentrations of alpha-(3-chlorophenoxy)-propionic acid (Acid) or 4-chloro-

TABLE X

| TREATMENT | Conc. (ppm) | APPLICATION | DIAMETER OF FRUIT (IN.) | LENGTH OF FRUIT (IN.) | LENGTH OF CROWN (IN.) | CROWN RATING |
|---|---|---|---|---|---|---|
| Amide + acid (5:95) | 250 | Crown | 4.6 | 4.3 | 2.1 | 0 |
| Amide + acid " | 500 | Crown | 4.7 | 4.9 | 1.7 | 1 |
| Amide + acid " | 1000 | Crown | 4.7 | 4.8 | 0.2 | 3 |
| Amide + acid " | 1500 | Crown | 4.9 | 4.9 | 0.8 | 4 |
| Amide + acid (5:95) | 250 | Foliage | 4.6 | 4.6 | 2.1 | 0 |
| Amide + acid " | 500 | Foliage | 5.0 | 5.1 | 2.3 | 0 |
| Amide + acid " | 1000 | Foliage | 4.8 | 4.8 | 1.9 | 1 |
| Amide + acid " | 1500 | Foliage | 4.9 | 4.6 | 2.9 | 2 |
| Amide + acid (95:5) | 250 | Crown | 4.6 | 4.5 | 2.0 | 0 |
| Amide + acid " | 500 | Crown | 4.7 | 4.6 | 1.7 | 2 |
| Amide + acid " | 1000 | Crown | 5.0 | 4.7 | 2.0 | 2 |
| Amide + acid " | 1500 | Crown | 4.8 | 4.8 | 1.2 | 4 |
| Amide + acid " | 2000 | Crown | 4.7 | 4.6 | 0.2 | 4 |
| Amide + acid (95:5) | 250 | Foliage | 4.8 | 4.7 | 2.7 | 0 |
| Amide + acid " | 500 | Foliage | 4.9 | 4.6 | 2.3 | 0 |
| Amide + acid " | 1000 | Foliage | 5.0 | 4.9 | 2.3 | 1 |
| Amide + acid " | 1500 | Foliage | 5.4 | 5.4 | 2.6 | 0 |
| Amide + acid " | 2000 | Foliage | 4.9 | 4.6 | 2.0 | 2 |
| Amide + acid (50:50) | 250 | Crown | 4.6 | 4.5 | 1.9 | 0 |
| Amide + acid " | 500 | Crown | 4.6 | 4.6 | 1.7 | 1 |
| Amide + acid " | 1000 | Crown | 4.6 | 4.6 | 0.8 | 3 |
| Amide + acid " | 1500 | Crown | 4.6 | 4.5 | 0.5 | 4 |
| Amide + acid " | 2000 | Crown | 4.5 | 4.4 | 0.2 | 4 |
| Amide + acid (50:50) | 250 | Foliage | 4.7 | 4.8 | 2.3 | 0 |
| Amide + acid " | 500 | Foliage | 4.6 | 4.4 | 2.2 | 1 |
| Amide + acid " | 1000 | Foliage | 4.5 | 4.3 | 2.0 | 1 |

TABLE X — Continued

| TREATMENT | | Conc. (ppm) | APPLICATION | DIAMETER OF FRUIT (IN.) | LENGTH OF FRUIT (IN.) | LENGTH OF CROWN (IN.) | CROWN RATING |
|---|---|---|---|---|---|---|---|
| Amide + acid | " | 1500 | Foliage | 4.4 | 4.2 | 1.8 | 1 |
| Amide + acid | " | 2000 | Foliage | 4.5 | 4.6 | 0.2 | 4 |
| Control | | 0 | | 4.6 | 4.5 | 2.9 | 0 | phenoxyacetic acid (4-CPA). Technical materials were dissolved in methanol and diacetone alcohol and diluted subsequently with water to yield solutions of 250, 500, 1000 and 2000 ppm concentrations of active compounds.

The aqueous solutions were employed in direct crown treatment or broadcast spray as described in Example VI above. The time of treatment, harvest and method of evaluations were as described in Example VI above.

Table XI is a compilation of results showing the effect on several external characters of the pineapple fruit and crown and a visual rating as described in Example VI, the test employing alpha-(3-chlorophenoxy) propionic acid, herein listed as "Acid"; and 4-chlorophenoxyacetic acid, herein listed as "Acid"; 4-chlorophenoxyacetic acid, herein listed as "4-CPA".

TABLE XI

| TREATMENT | CONC. (PPM) | APPLICATION | DIAMETER OF FRUIT (IN.) | LENGTH OF FRUIT (IN.) | LENGTH OF CROWN (IN.) | CROWN RATING |
|---|---|---|---|---|---|---|
| Acid | 250 | Crown | 4.5 | 4.2 | 2.1 | 2 |
| Acid | 500 | Crown | 4.5 | 4.3 | 2.0 | 2 |
| Acid | 1000 | Crown | 4.8 | 4.7 | 1.6 | 3 |
| Acid | 1500 | Crown | 4.3 | 4.2 | 0.9 | 4 |
| Acid | 2000 | Crown | 4.7 | 4.9 | 0.1 | 4 |
| Acid | 250 | Foliage | 4.6 | 4.2 | 2.6 | 0 |
| Acid | 500 | Foliage | 4.6 | 4.4 | 2.0 | 0 |
| Acid | 1000 | Foliage | 4.6 | 4.6 | 1.8 | 0 |
| Acid | 1500 | Foliage | 4.9 | 5.0 | 1.8 | 2 |
| Acid | 2000 | Foliage | 4.9 | 5.1 | 1.4 | 3 |
| 4-CPA | 250 | Crown | 4.4 | 4.1 | 2.7 | 0 |

I claim:

1. A method for controlling the development of the crown on a growing pineapple fruit and increasing the size and weight of the pineapple fruit which comprises applying to the plant, after flowering and at least 2 months prior to harvesting, an effective amount of a compound of the formula:

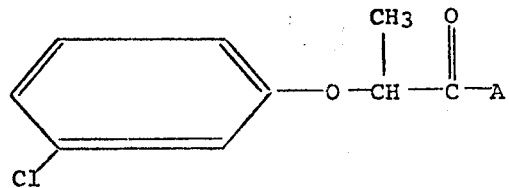

wherein A is a member selected from the group consisting of OH, $NH_2$, $NHR_1$, $NR_1R_2$, $OR_3$ and OX wherein $R_1$, $R_2$ and $R_3$ are each independently alkyl radicals of from 1 to 4 carbon atoms and X is selected from the group consisting of an ammonium and an alkali metal ion.

2. A method for controlling the development of the crown on a growing pineapple fruit and increasing the size and weight of the pineapple fruit, which comprises applying to the plant, after flowering and at least 2 months prior to harvesting, an effective amount of alpha-(3-chlorophenoxy)-propionic acid.

3. A method for controlling the development of the crown on a growing pineapple fruit and increasing the size and weight of the pineapple fruit which comprises applying to the plant, after flowering and at least 2 months prior to harvesting, an effective amount of alpha-(3-chlorophenoxy)-propionamide.

4. The method of claim 2, wherein the effective amount is from about 0.1 to about 5 pounds per acre.

5. The method of claim 3, wherein the effective amount is from about 0.1 to about 5 pounds per acre.

* * * * *